United States Patent
Webster et al.

(10) Patent No.: US 10,375,290 B2
(45) Date of Patent: Aug. 6, 2019

(54) VIDEO EQUIPMENT CONTROL

(71) Applicant: Ross Video Limited, Iroquois (CA)

(72) Inventors: Neil Webster, Ontario (CA); Daniel M McInnis, Ontario (CA); Jean E. Frojo, Ontario (CA)

(73) Assignee: Ross Video Limited, Iroquois (CA)

( * ) Notice: Subject to any disclaimer, the term of this patent is extended or adjusted under 35 U.S.C. 154(b) by 48 days.

(21) Appl. No.: 15/818,663

(22) Filed: Nov. 20, 2017

(65) Prior Publication Data
US 2019/0158720 A1    May 23, 2019

(51) Int. Cl.
*B25J 5/00* (2006.01)
*B25J 9/16* (2006.01)
*H04N 5/232* (2006.01)

(52) U.S. Cl.
CPC .......... *H04N 5/23203* (2013.01); *B25J 5/007* (2013.01); *B25J 9/162* (2013.01); *H04N 5/23296* (2013.01); *Y10S 901/01* (2013.01)

(58) Field of Classification Search
CPC .......... H04N 5/23203; H04N 5/23296; H04N 5/2257; B25J 5/007; B25J 9/162; Y10S 901/01; G02B 13/001; G08B 13/19621; G08B 13/19623; G08B 13/1963; G08B 13/19632; H04M 1/0264; H04M 2250/20; B66F 11/048; G06T 1/0014; G03B 17/48; G03B 2217/00; G03B 2217/002; G06F 1/1607; A63F 2300/1062
See application file for complete search history.

(56) References Cited

U.S. PATENT DOCUMENTS

| | | | | |
|---|---|---|---|---|
| 5,228,757 A | * | 7/1993 | Ito | B60T 8/1755 303/146 |
| 6,020,875 A | * | 2/2000 | Moore | A63F 13/02 345/156 |
| 6,154,198 A | * | 11/2000 | Rosenberg | A63F 13/06 345/156 |
| 6,390,505 B1 | * | 5/2002 | Wilson | B62D 1/181 280/775 |

(Continued)

OTHER PUBLICATIONS

Schunk GmbH & Co. KG; "6-Axis Force/Torque Sensors, The greatest Variety on the Market with around 150 Variants", 2015, pp. 1-16.

*Primary Examiner* — Chia Wei A Chen
(74) *Attorney, Agent, or Firm* — Wolf, Greenfield & Sacks, P.C.

(57) ABSTRACT

A control handle extends at least partially around a hub. Multiple arms extend in respective different directions between the hub and the control handle. Sensors sense an effect of an input force applied to the control device and acting on each of the arms relative to multiple directions. A controller interface is coupled to the sensors, to enable communication with a controller of the video equipment. Such a control device could be implemented in conjunction with a video equipment pedestal that also includes a base and an equipment support. The control device could be used to drive motion of the video equipment pedestal based on readings by the sensors. A user input device could be provided to control one or more of virtual mass, virtual friction, enabling and disabling of driving motion, and/or enabling and disabling of motion relative to any one or more of multiple axes.

23 Claims, 12 Drawing Sheets

(56) References Cited

U.S. PATENT DOCUMENTS

| | | | | |
|---|---|---|---|---|
| 7,027,032 B2* | 4/2006 | Rosenberg | G05G 9/047 | 345/156 |
| RE39,906 E * | 11/2007 | Roston | F16F 15/00 | 318/561 |
| 7,327,348 B2* | 2/2008 | Goldenberg | G05G 1/02 | 318/568.11 |
| 7,489,309 B2* | 2/2009 | Levin | G06F 3/016 | 345/156 |
| 7,775,884 B1* | 8/2010 | McCauley | A63F 13/06 | 463/39 |
| 8,364,342 B2* | 1/2013 | Springer | G06F 3/016 | 701/36 |
| 9,248,839 B1* | 2/2016 | Tan | B60W 50/08 | |
| 2004/0164960 A1* | 8/2004 | Jacobus | B25J 9/1689 | 345/161 |
| 2004/0262071 A1* | 12/2004 | Duits | B62D 5/005 | 180/402 |
| 2005/0017454 A1* | 1/2005 | Endo | G06F 3/016 | 273/317.1 |
| 2006/0284839 A1* | 12/2006 | Breed | B60W 50/16 | 345/156 |
| 2008/0220868 A1* | 9/2008 | Huang | A63F 13/06 | 463/38 |
| 2011/0153160 A1* | 6/2011 | Hesseling | B60K 35/00 | 701/41 |
| 2012/0296528 A1* | 11/2012 | Wellhoefer | B62D 1/046 | 701/48 |
| 2013/0002416 A1* | 1/2013 | Gazit | B62D 1/28 | 340/438 |
| 2013/0024071 A1* | 1/2013 | Sivertsen | B60K 35/00 | 701/41 |
| 2013/0100341 A1* | 4/2013 | Codd | B66F 11/048 | 348/373 |
| 2013/0206915 A1* | 8/2013 | Desaulniers | B64C 39/024 | 244/165 |
| 2013/0316826 A1* | 11/2013 | Levanon | A63F 13/08 | 463/36 |
| 2015/0016923 A1* | 1/2015 | Brown | A61F 5/01 | 414/1 |
| 2015/0217776 A1* | 8/2015 | Berezhnyy | B60K 28/06 | 356/614 |
| 2015/0367846 A1* | 12/2015 | Sans | B62D 15/027 | 701/23 |
| 2016/0189560 A1* | 6/2016 | Sizov | G09B 9/042 | 434/67 |
| 2016/0272197 A1* | 9/2016 | Hulten | B62D 6/003 | |
| 2016/0303484 A1* | 10/2016 | Masutti | A63G 31/16 | |
| 2016/0327383 A1* | 11/2016 | Becker | G01B 11/005 | |
| 2016/0337815 A1* | 11/2016 | Cuddihy | H04W 4/046 | |
| 2017/0135635 A1* | 5/2017 | Bostick | A61B 5/681 | |
| 2017/0249856 A1* | 8/2017 | Fischer | G09B 19/16 | |
| 2018/0336329 A1* | 11/2018 | Walford | G06F 21/32 | |
| 2018/0370559 A1* | 12/2018 | Swamidason | B62D 1/185 | |
| 2019/0058870 A1* | 2/2019 | Rowell | H04N 5/23267 | |
| 2019/0061807 A1* | 2/2019 | Kelber | B62D 5/30 | |
| 2019/0066387 A1* | 2/2019 | Grossmann | G06T 19/20 | |

\* cited by examiner

VIDEO EQUIPMENT CONTROL

FIELD OF THE INVENTION

This invention relates generally to video equipment and, in particular, to control of video equipment operation.

BACKGROUND

Conventional manual video equipment pedestals include pedestals that are rotated and/or moved around a floor or other support surface by an operator. For example, a video camera operator might use a steering ring that is mounted to the pedestal, to push against the natural inertia and friction that the pedestal provides. A pan/tilt head or equipment that is mounted to a pedestal could provide additional manual controls, such as bars for controlling video camera pan and tilt.

A video equipment pedestal could provide mechanically assisted operation, by using pressurized gas struts that are pressurized to counteract gravity. With no force applied, a pedestal column to which a payload and possibly an equipment pan/tilt head are mounted, for example, remains at the same height and does not rise or lower. Elevation of such a pedestal column could then be changed by applying forces that are significantly lower than would otherwise be required to raise the column and payload. Raising or lowering forces could be applied to a steering ring or to another part of a pedestal or payload to control elevation.

Full robotic control is also available for some pedestals. In one conventional implementation of robotic control, a joystick is provided in a control device that is mounted to a pan/tilt bar, for controlling rotation and movement of the pedestal and raising and lowering of the pedestal column.

Also, in a typical video equipment deployment, separate and different types of controls or devices are provided to control different aspects of video equipment operation, such as pedestal motion and video equipment functions.

SUMMARY

According to one aspect of the present disclosure, a video equipment control device includes: a hub; a control handle extending at least partially around the hub; a plurality of arms extending in respective different directions between the hub and the control handle; a plurality of sensors to sense an effect of an input force applied to the control device and acting on each of the arms relative to multiple directions; and a controller interface coupled to the sensors, to enable communication with a controller of the video equipment.

The sensors could include multiple sensors mounted to each arm.

In some embodiments, the control handle is a ring that extends around the hub.

A control device could also include a respective compliant coupling between the control handle and each of the arms. Each compliant coupling could be a leaf spring, for example.

The controller could also be provided as part of the control device, and coupled to the controller interface, to receive readings from the sensors and to provide control signals to the video equipment based on the readings.

The controller could be separate from the control device in other embodiments.

A video equipment pedestal according to another aspect of the disclosure includes: a base; an equipment support coupled to the base, to support video equipment on the base; a hub coupled to the equipment support; a control handle extending at least partially around the hub; a plurality of arms extending in respective different directions between the hub and the control handle; a plurality of sensors to sense an effect of an input force applied to the control device and acting on each of the arms relative to multiple directions; and a controller coupled to the sensors, to drive motion of the video equipment pedestal based on readings by the sensors.

The motion could involve movement of the base on a surface.

The motion could also or instead involve movement of the equipment support relative to the base.

A video equipment pedestal could also include a user input device to control virtual mass associated with the motion.

In some embodiments, a video equipment pedestal includes a user input device to control virtual friction associated with the motion.

A video equipment pedestal could also or instead include a user input device to control enabling and disabling of driving motion of the video equipment pedestal by the controller.

A user input device to control enabling and disabling of motion relative to any one or more of multiple axes could also or instead be provided in a video equipment pedestal.

A video equipment system could include such a video equipment pedestal and video equipment mounted to the equipment support.

A further aspect of the present disclosure provides a method that includes: receiving readings from a plurality of sensors that sense an effect of an input force applied to a control device and acting on each of a plurality of arms of the control device relative to multiple directions, the plurality of arms extending in respective different directions between a control handle of the control device and a hub of the control device around which the control handle at least partially extends; and providing control signals to video equipment based on the readings.

Such a method could also involve: resolving the readings into linear force components and moment components; and generating the control signals based on the linear force components and the moment components.

Providing control signals could involve providing the control signals to a controller that is located remotely from the control device.

The control signals could include a control signal to control motion of the video equipment.

A method could then include receiving an input from a user input device to control virtual mass associated with the motion. Such a method could involve providing the control signal to control the motion of the video equipment further based on the received input.

A method could also or instead involve receiving an input from a user input device to control virtual friction associated with the motion, in which case the method could involve providing the control signal to control the motion of the video equipment further based on the received input.

In some embodiments, a method also or instead involves receiving an input from a user input device to control enabling and disabling motion control of the video equipment based on the control signal.

A method could also or instead involve receiving an input from a user input device to control enabling and disabling of motion control relative to any one or more of multiple axes.

Another method involves: providing a video equipment control device hub; providing a control handle for the video equipment control device, the control handle extending at least partially around the hub; providing a plurality of arms for the video equipment control device, the plurality of arms extending in respective different directions between the hub and the control handle; providing a plurality of sensors to sense an effect of an input force applied to the control device and acting on each of the arms relative to multiple directions; and providing a controller interface coupled to the sensors, to enable communication with a controller of the video equipment.

The method could also involve mounting multiple sensors of the plurality of sensors to each arm.

The controller could be configured to drive motion of the video equipment based on readings by the sensors, in which case a method could also involve providing one or more of: a user input device to control virtual mass associated with the motion; a user input device to control virtual friction associated with the motion; a user input device to control enabling and disabling of motion control; and a user input device to control enabling and disabling of motion relative to any one or more of multiple axes.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
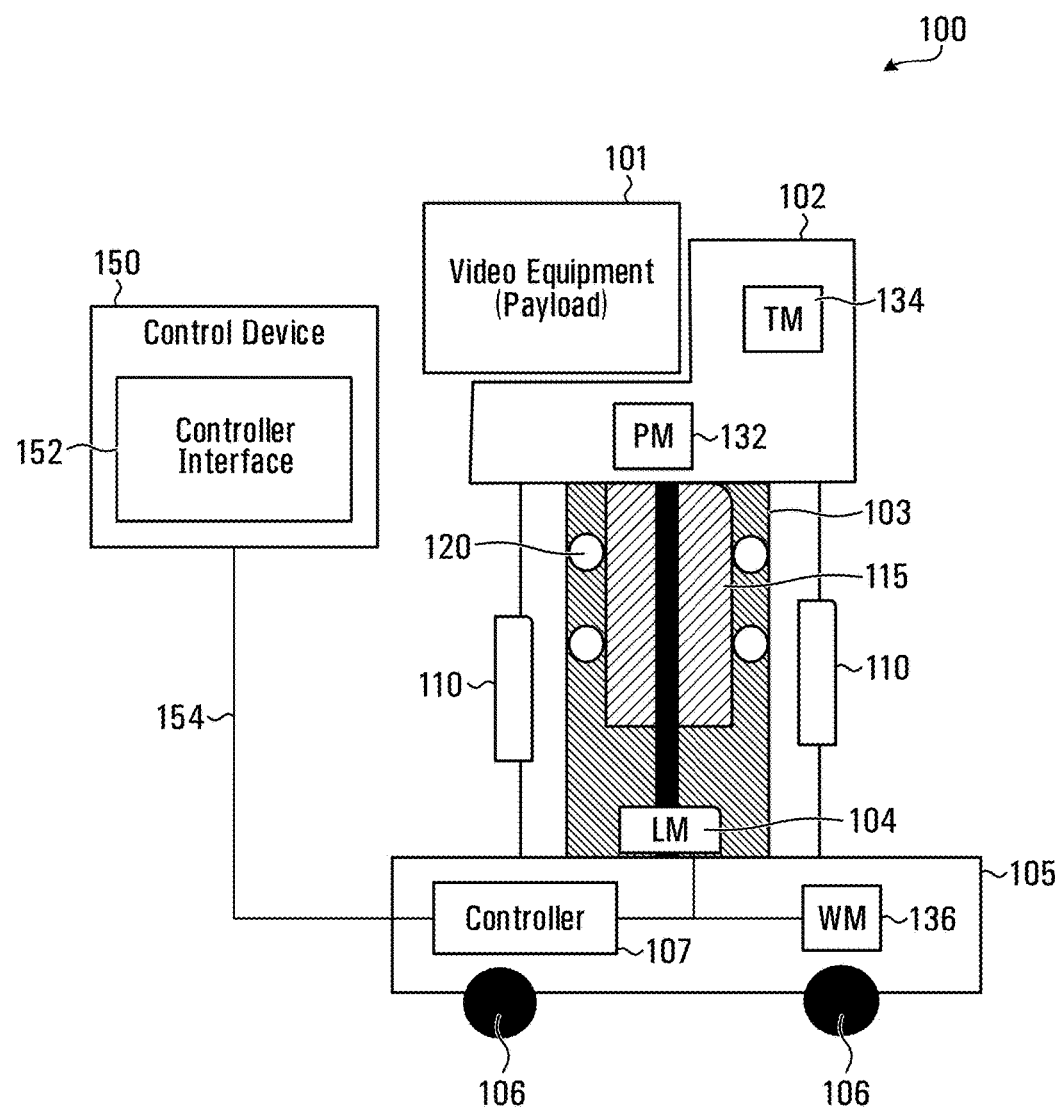
FIG. 1 is a block diagram illustrating an example of a robotic system.

Some video equipment operators may prefer to control robotic video equipment in much the same way as they would control manual equipment. Video camera operators, for example, might prefer to have tactile or mechanical feedback from a robotic video camera pedestal control device so that the "weight" or "feel" of the pedestal is similar to that of a manual, non-robotic pedestal. Weight or feel could also or instead be controllable. For example, a knob or other control device could be provided to enable an operator to increase or decrease a "virtual" mass and/or friction of controlled equipment to make it feel heavier or lighter during use.

Operators might also prefer a moving equipment pedestal or mounting platform for which control is intuitive. This may allow an operator to perhaps better focus on their primary objective, which is composition of a shot in the case of a video camera operator for example.

Manual control of movement and rotation of a video equipment pedestal using a manual steering ring is intuitive to video equipment operators. An operator applies a force to the steering ring, in a direction consistent with how the pedestal is to be moved.

Some pedestals implement robotic control using a joystick, which tends to be less intuitive in at least some respects. Using a joystick for elevation control to raise and lower a pedestal column, for example, is not natural for many video equipment operators, and can present a significant learning curve to operators who are likely more accustomed to operating manual pedestals. Although lateral translation and turning of a pedestal might appear to be intuitive for joystick control, even these operations lose the weight and feel of manual control that operators expect and may prefer.

As disclosed in further detail herein, embodiments may emulate a manual or passive system by sensing forces that are applied to a control device and driving motion of a robotic video equipment pedestal under active control, but in a manner that may better approximate or create an illusion of operating a manual pedestal. At least the sensing of control inputs for driving motion of a video equipment pedestal or otherwise controlling a component is illustrative of the technical character of embodiments of the present disclosure. Control weight and feel, and whether control is intuitive, are all very important elements in developing operator control systems, but the control devices, systems, and techniques disclosed herein are explicitly technical in nature.

As an illustrative example, active control to drive motion of a video equipment pedestal is described in detail herein. However, it should be appreciated that other aspects of video equipment operation could be controlled using embodiments of the disclosed control device. In addition to or instead of controlling pedestal movement, for example, a control device could be used to control pan, tilt, zoom, and/or other aspects of video equipment operation. Control is also not limited specifically to equipment that is necessarily implemented in conjunction with a pedestal, and could be extended to a pan/tilt head by itself, a dolly, and/or other types of equipment.

FIG. 1 is a block diagram illustrating an example of a robotic system 100, which includes a payload 101 in the form of video equipment such as a video camera mounted on a head 102. The head 102 rests on an elevation column 103. A lift motor (LM) 104 is used to raise and lower the head 102 and payload 101. The head 102 is a mechanically assisted pan/tilt head in this example. A pan motor (PM) 132 controls pan motion of the payload, and a tilt motor (TM) 134 controls tilt motion of the payload in this example. As noted above, embodiments are disclosed herein in the context of pedestal control as an illustrative example, but could be implemented in conjunction with a fully manual head that does not include a PM 132 or a TM 134, a stationary head or mount that carries the payload 101 in a fixed orientation on the column 103, and/or other installations in which other types of equipment or video equipment functions are controlled.

In the illustrated example, the elevation column 103 is a linear translation device that includes telescoping tubes, with the head 102 attached to the top. Other lift arrangements may alternatively be used. In the illustrated example, the elevation column 103 includes an inner column 115 moving on bearings 120, although other implementations, including a linear bearing for example, are also possible. A number of struts 110 (two can be seen in the illustrated embodiment, but there may be zero or more) are attached to the column 103 and work like pistons, to push the column 103 up to assist the lift motor 104 in keeping the pan tilt head 102 at a given height by compensating, to at least a certain extent, for gravity.

The robotic system 100 also has a base 105. In the illustrated example, the base 105 is mounted on a plurality of wheels 106. One or more wheel motors (WM) 136 drive one or more of the wheels 106. The base 105 and the column 103 together represent an example of a video equipment pedestal.

In the example robotic system 100, a control device 150 is illustrated separately from the pedestal base 105 and column 103. Control inputs are provided by an operator, through application of force to a steering ring other control element for example, and are sensed by the control device 150. The sensed control inputs, or control signals that are based on those sensed inputs, are provided to the controller 107 through the control interface 152 and the control connection 154, and the controller controls the WM 136 and the LM 104 accordingly. The controller 107 may also control the PM 132 and the TM 134. Connections between the controller 107 and the PM 132 and TM 134 are not shown in FIG. 1 in order to avoid congestion in the drawing.

The controller interface 152 and the control connection 154 could support wireless and/or wired communication between the control device 150 and the controller 107. The control connection 154 therefore need not necessarily be a physical connection. It should also be appreciated that a direct connection as shown in FIG. 1 is an example. The controller interface 152 could be implemented in any of various ways, depending upon the type(s) of connection(s) and communication to be supported between the control device 150 and the controller 107.

The control device 150 could be remotely located from the remainder of the robotic system 100, co-located with the remainder of the robotic system 100, or even mounted to or integrated into the pedestal, the head 102, or the payload 101. In one embodiment, the control device 150 includes a steering ring that is mounted to the column 103, between the column and the head 102. The controller interface 152 could then be implemented as a plug or other form of connector that is compatible with an existing local control port on the column 103 or base 105 or otherwise provided in the pedestal.

Communications between the control device 150 and the controller 107 could be indirect, through other elements in a control computer or a network between the control device 150 and the controller 107. In some embodiments, a single control device 150 is used to control multiple pedestals. The control device 150 could be implemented in a central control station that communicates with multiple pedestals, through a network interface at 152 for example.

The controller 107 is illustrated as part of the base 105, but could be implemented in another part of a robotic system, such as in the head 102 or even the payload 101. The controller 107 could instead be implemented in the control device 150, with the controller interface 152 then being an interface that supports local communication within the control device 150. In this case, control signals could be provided to the WM 136, the LM 104, and any other controlled components through control connections to those components.

The robotic system 100 is a very specific example of a system in which embodiments of the present disclosure could be implemented. More generally, control techniques and devices as disclosed herein could be used in conjunction with any of various types of video equipment. For example, motors 104,132,134,136 are specific examples of actuators that may be provided in a video equipment pedestal, head, or payload. Not necessarily all these actuators will be present. For example, a pan/tilt head could be implemented at a static vertical position, with none of the components associated with changing elevation of the head 102. Alternatively, additional and/or different actuators may be used. More generally, embodiments disclosed herein could be used with a pedestal that includes one or more actuators that control motion of the pedestal as a whole or a part of the pedestal.

Figure 2:
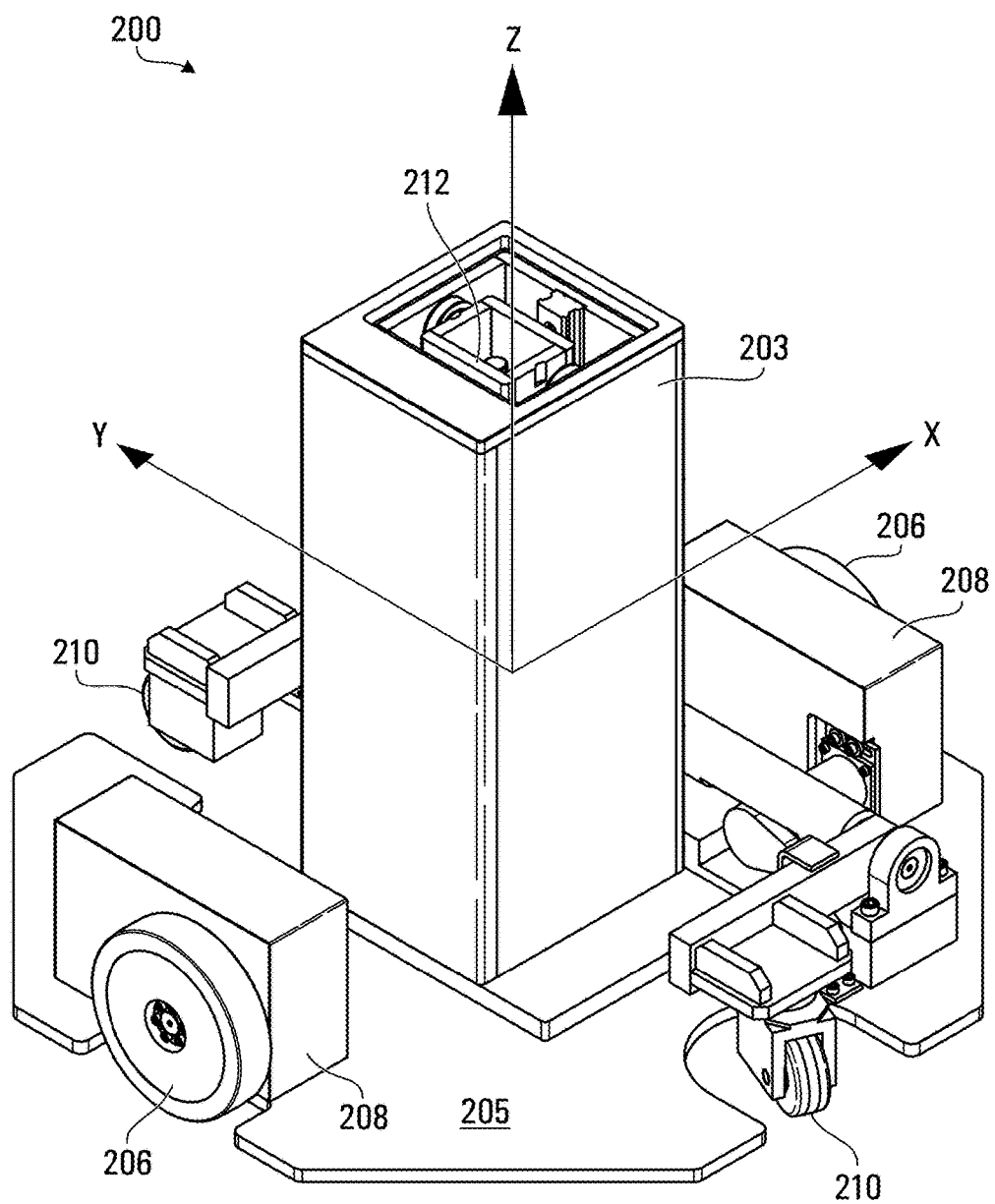
FIG. 2 illustrates an example video equipment pedestal.

FIG. 2 illustrates an example video equipment pedestal 200, which includes a column 203 and a base 205. The example pedestal 200 could include a housing or shroud that at least partially encloses the base 205, but this is not shown in FIG. 2 so that other components are visible in the drawing. The column 203 is coupled to or mounted on the base 205, which in turn is supported on a support surface such as a floor by wheels 206, 210. In FIG. 2, there are two pairs of wheels, including a pair of driven wheels 206 which are driven by wheel motors 208, and a pair of non-driven wheels 210 which are caster-type wheels in the example shown. In the column 203, the inner tube 212 provides an upper surface onto which video equipment is mountable.

The example pedestal 200 is capable of lateral movement or translation on a support surface, forward and backward, in a direction that is labeled as the Y direction in FIG. 2. The pedestal is also rotatable around the Z direction in order to change the direction of translation, if the pedestal is to be moved laterally in a different direction than the Y direction according to a current orientation of the pedestal. An X direction is also labeled in FIG. 2 in order to define three coordinate axes in a pedestal-relative frame of reference which is used herein by way of example. Embodiments may be implemented in conjunction with other types of pedestals which are not limited to +/−Y direction lateral translation as shown in FIG. 2.

Full 6-axis sensing of force components in the three coordinate axes in the pedestal-relative frame of reference shown in FIG. 2 involves sensing of forces, or an effect of forces such as bending stress, and resolving sensor readings into 3 principal linear direction components along each axis (X, Y, Z) and 3 moment or torque components around or about each axis.

Such 6-axis sensing could be implemented using a single 6-axis force/torque sensor at the center of a steering ring and mounted to the inner tube 212 of the pedestal 200. However, such sensors tend to be quite expensive, and might not be suited to sensing forces of magnitudes that are typically applied by a human operator in controlling a video equipment pedestal.

According to some embodiments disclosed herein, multiple sensors are added to a steering ring, to robotically control a pedestal. For example, sensors in the form of strain gauges could be added to the arms or spokes of a steering ring, to sense forces by detecting bending of the arms under operator applied forces. Strain measurements from the strain gauges can then be resolved into force and torque components relative to the three orthogonal axes in FIG. 2, for example.

Steering rings as disclosed herein are fixed or stationary steering rings in that they are not intended to move relative to a pedestal or other base on which they are mounted. Input forces may bend one or more arms of a steering ring or otherwise deform parts of a steering ring, but do not rotate a steering ring relative to its base in the sense of a vehicle steering wheel, for example.

Figure 3:
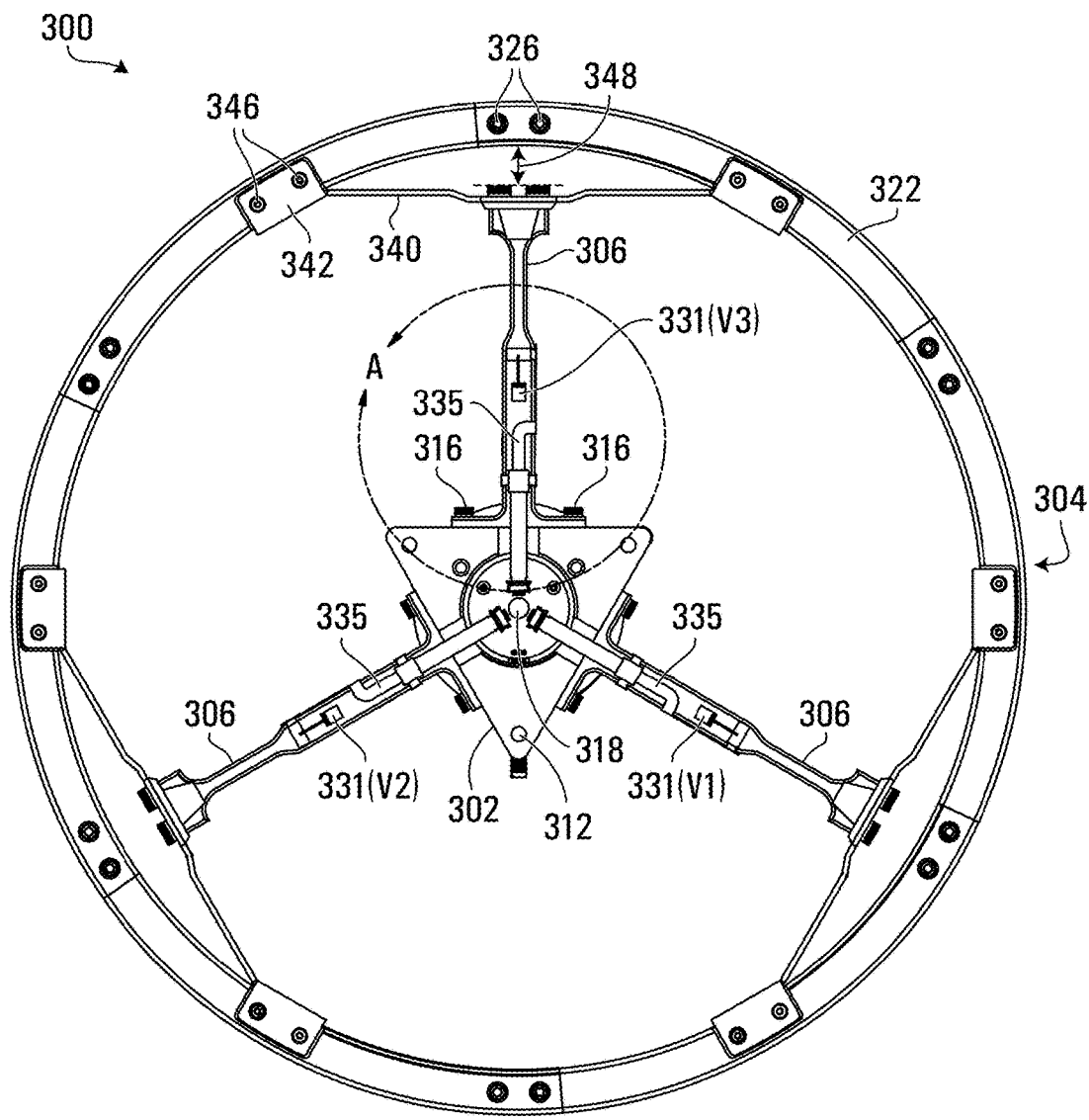
FIGS. 3-5 illustrate an example control device according to an embodiment.
Figure 4:
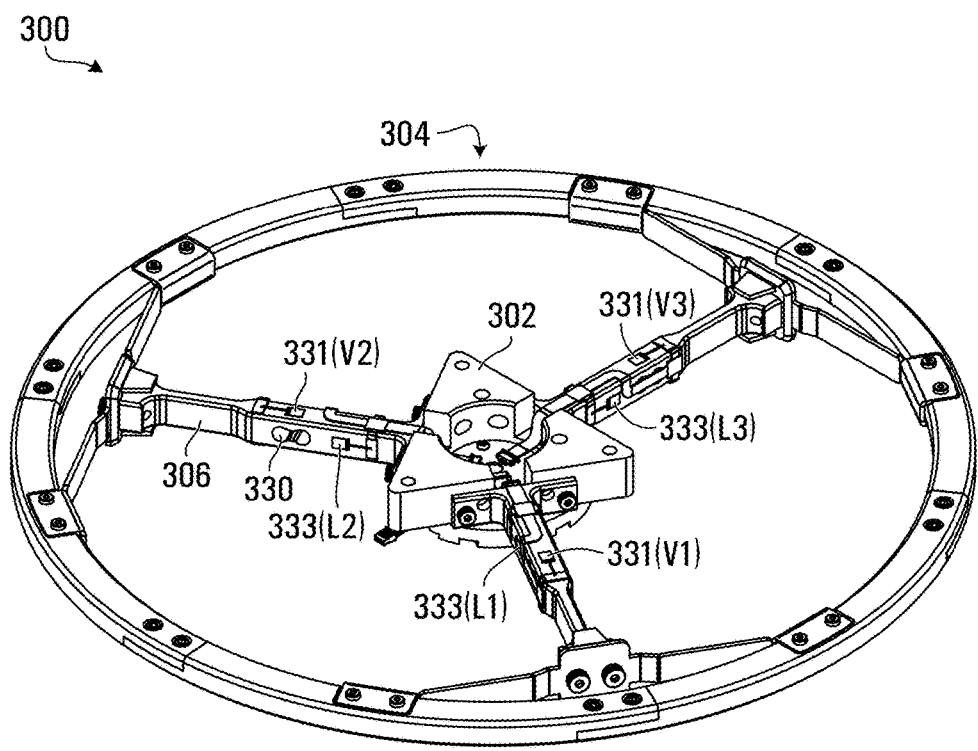
Figure 5:
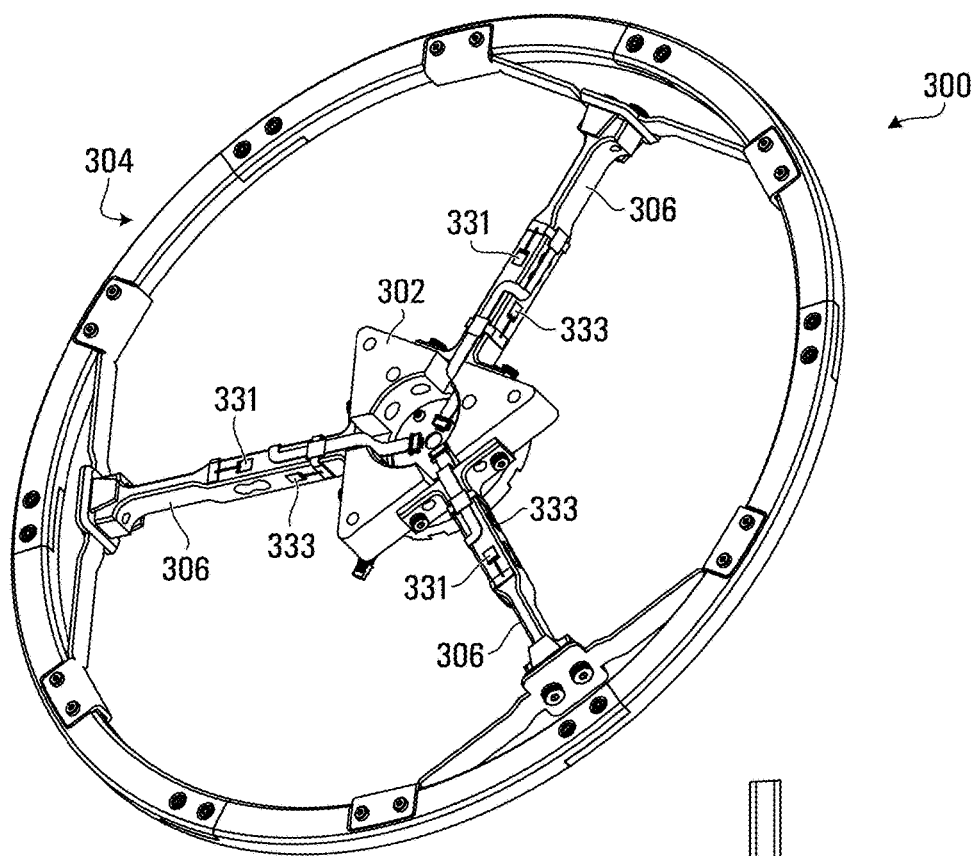
Figure 6:
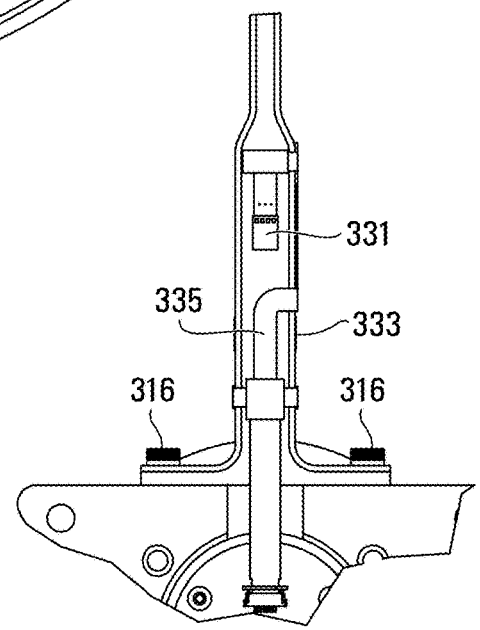
FIG. 6 illustrates detail A of FIG. 3.
Figure 7:
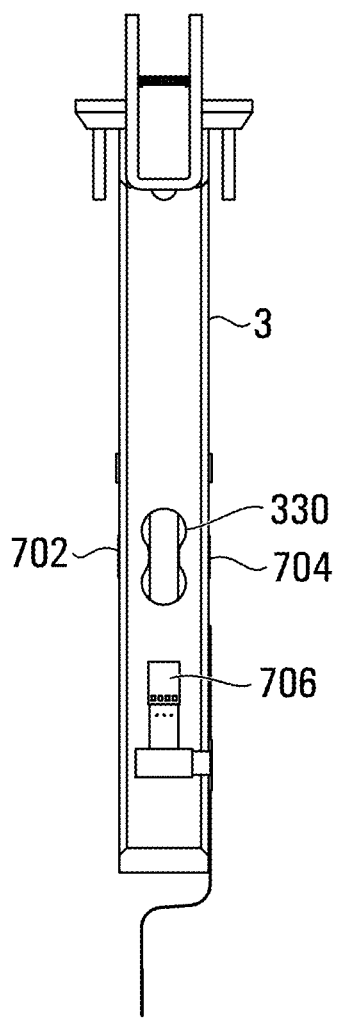
FIGS. 7-10 illustrate views of an arm or spoke of the example control device of FIGS. 3-5.
Figure 8:
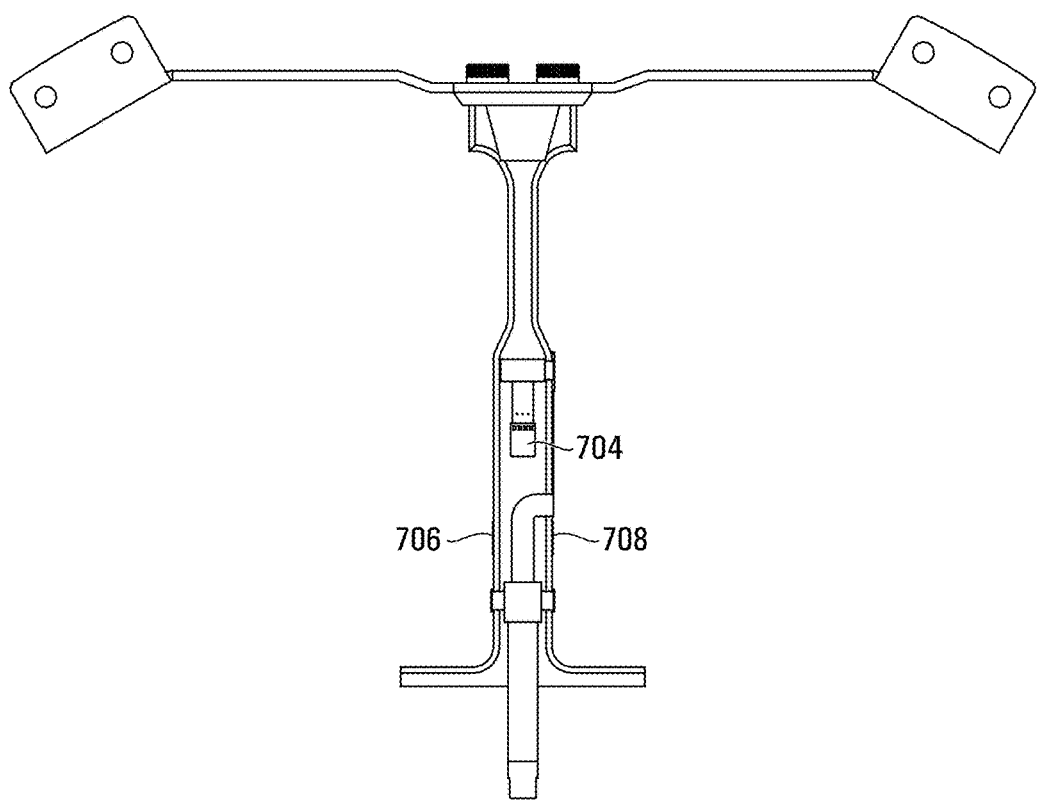
Figure 9:
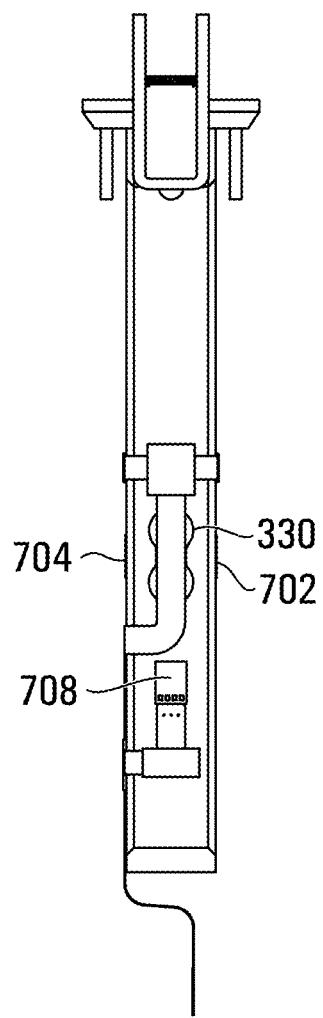
Figure 10:
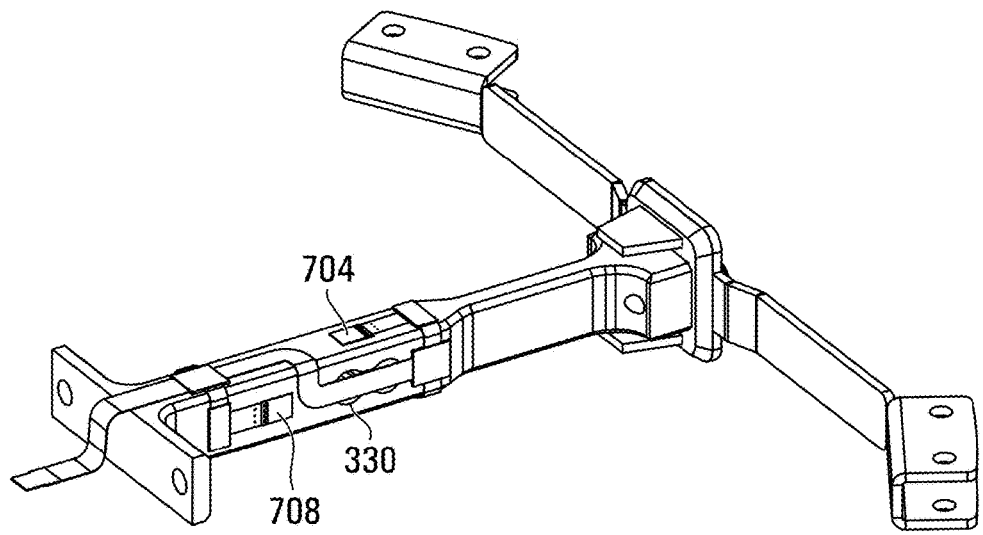

FIGS. 3-5 illustrate an example control device according to an embodiment, and FIG. 6 illustrates detail A of FIG. 3. FIGS. 7-10 illustrate views of an arm or spoke of the example control device of FIGS. 3-5. FIGS. 7 and 9 are opposite side views, FIG. 8 is a top view, and FIG. 10 is an isometric view.

The control device 300 in FIGS. 3-5 could be used for active control of a video equipment pedestal, to drive motion of such a pedestal for example. A control handle 304 in the form of a ring extends around a hub 302 in the embodiment shown, but in other embodiments the control handle could extend only partially around the hub. Arms or spokes 306 extend in respective different directions between the hub 302 and the control handle 304. Multiple sensors 331, 333 are provided to sense an effect of forces acting on each arm 306. The sensors 331, 333 could be provided on the arms 306 as shown, but could be mounted on the hub 302 and/or elsewhere in other embodiments. In an embodiment, each sensor 331, 333 is implemented using a pair of sensor elements as shown perhaps most clearly in, and described below with reference to, FIGS. 7-10.

Although not explicitly shown in FIG. 3, a control device also includes a controller interface, as shown at 152 in FIG. 1 for example, coupled to the sensors 331, 333 to enable communication with a controller of a video equipment pedestal or other controlled component. One controller interface could be coupled to all of the sensors 331, 333, one controller interface could be provided per arm 306, or there could potentially be a separate controller interface coupled to each sensor. Connections coupling the sensors 331, 333 to the controller interface(s) could be wireless or wired connections. Wired connections could run along each arm 306 toward a control interface(s) at the centre of the hub 302, for example. Flex connectors 335 are shown as an example of connections that could be used to couple the sensors 331, 333 to a controller interface.

In the example shown, there is one connection per arm 306. A control interface could include multiple connectors, or multiple connectors could connect to a single control interface such as a multi-wire cable. The connectors shown in FIGS. 3-10 are intended only as an illustrative example.

Considering the hub 302 in more detail, bores 312 could be used in conjunction with bolts, posts, and/or other fastening structures or elements in mounting the hub to a pedestal or to a component of a remote control system, for example. In the case of a pedestal-mounted control device 300, the hub 302 could be mounted to the end of the inner tube 212 (FIG. 2) and a head or equipment could then also be mounted to the inner tube over the hub. This order of mounting or assembly could be reversed. Mounting of a head or equipment and a control device to a pedestal also need not be separate operations. For example, the bores 312 and bores in a head or equipment could be aligned with bores in the inner tube 212 of the pedestal, and then the hub 302, the head or equipment, and the pedestal could be attached together at the same time.

A central bore 318 through the hub 302 could be provided to allow wiring, such as control and/or power wiring, to be routed between the pedestal and a head or video equipment, through the hub.

An end of each arm 306 is coupled to the hub 302, with two fasteners 316 in the example shown. Screws, rivets, and bolts are examples of the fasteners 316 and other fasteners herein. Alternative structures, materials, or techniques could be used to fasten parts together by adhesive or other types of bonding, welding, etc.

Multiple fasteners 316, and/or a close fit between the arms 306 and the adjacent surfaces of the hub 302 may assist in avoiding rotation or movement of the arms other than biaxial bending of the arms that can be sensed by the sensors 331, 333 when force is applied to the control device 300. Although it is expected that input forces would normally be applied by an operator to the control handle 304, input force could also or instead be applied to other parts of the control device 300.

The sensors 331, 333 in some embodiments are strain gauges to sense bending of the arms 306, and avoiding rotation and other movement of the arms could be preferable at least in such embodiments. The arms 306 could be fastened to the hub 302 in other ways, or even made as part of the hub to bypass any fastening of the arms to the hub.

In the embodiment shown in FIGS. 3-10, a structures 330 is formed in each of the arms 306. This structure 330 may better localize bending of the arms 306 to the areas at which the sensors 331, 333 are to be mounted to the arms or otherwise coupled to the arms to sense the effect of forces that are acting on the arms. Such a structure 330, or multiple structures in some embodiments, could be used to strategically reduce the cross-sectional area parallel to a loading axis of each arm 306 in specific locations. This could be useful, for example, in producing significant strains in the locations of the sensors 331, 333 for measurement in some embodiments. This may assist in allowing the arms 306 to bend within a range of expected input forces from an operator.

The arms 306 need not have a symmetrical or uniform structure, as illustrated in FIG. 3. Other embodiments could be implemented with arms that have a symmetrical or uniform shape, or otherwise have a different shape than shown in the example of FIGS. 3-10.

In some embodiments, control device arms could be directly coupled to, or even integrated or unitary with, a control handle. In FIGS. 3-5 and 7-10, however, a respective elastically deformable member 340, illustratively a leaf spring, is coupled between the control handle 304 and each arm 306. Each arm is coupled to a leaf spring 340 using one or more fasteners 338, two in the example shown. Two fasteners 338 could be used to reduce or prevent the rotation of the leaf springs. If only one fastener were used, then this could create a rotation axis and allow an undesirable movement of the leaf springs. Other fastening structures or techniques to lock such movement of the leaf springs could include welding, riveting, and/or or positive and negative features on the arms 306 and the leaf springs that fit into each other.

Ends of each member 340 are coupled to, and could be formed as, brackets 342 or other structures for attachment to the control handle 304 with one or more fasteners 346, two of which are shown in FIGS. 3-5 and 7-10. As described above, the multiple fasteners 346 could be useful in reducing or preventing undesirable movement of the members 340, and other fastening structures or techniques such as welding, riveting, and/or positive and negative features on the members 340 and the control handle 304 could be used in other embodiments.

Leaf springs are also an illustrative example of the members 340. Other elastically deformable members, with similar or different attachment structures, are also contemplated. For example, coil springs, bushings such as rubber bushings, or pressurized gas struts that are designed to return to a rest position in the absence of input force could be implemented as elastically deformable members in other embodiments.

The leaf springs 340, and clearance between the leaf springs and the control handle 304 as shown at 348 in FIG. 3, could be particularly useful in avoiding absorption of forces by an arm 306 without any of the arms bending to a degree that can be sensed by the sensors 331, 333. For example, if the arms 306 were to be directly coupled to the control handle 304 and an operator were to apply a force in a direction along an arm, then that arm could potentially absorb that force without any bending being sensed by the sensors 331, 333 on that arm or any other arm. The members 340, illustrative of a form of compliant coupling between the control handle 304 and each arm 306, and the clearances 348 as shown in FIG. 3 may help reduce this effect and provide for sensing over a wider range of forces and directions (along the axis of an arm) than might otherwise be possible.

Such compliant couplings may be useful in maintaining sensitivity at all parts of the control handle 304. Without such couplings there could be reduced ability to detect forces applied along the axis of any arm 306. In the example shown in FIGS. 3-5 and 7-10, the leaf springs could provide linear elastic compliance along the longitudinal axis of each arm 306. This may be useful in allowing for an operator to apply a force directly in-line with an arm 306, as the leaf spring that is coupled to that arm would flex and allow for the lateral bending of the other two arms. If the leaf springs or some other form of compliant coupling were not provided, and instead each arm 306 is directly coupled to the control handle 304, then the action of pushing on the control handle directly in-line with one arm might not cause the two other arms to bend enough for the sensors 331, 333 to detect, as the arm that is being pushed on could absorb the majority of the force that is being applied.

The control handle 304 could be in the form of a ring, as shown, that extends around the hub 302. It should be appreciated that the hub 302 and the control handle 304 need not necessarily be oriented in the same plane. For example, the control handle 304 could be lower or higher than the hub 302 when the control device 300 is mounted to a pedestal or a control system component. The arms 306 could be curved or otherwise adapted to extend between the hub 302 and the control handle 304 in different planes. References herein regarding the control handle 304 extending at least partially around the hub 302 should be interpreted accordingly, without any connotation that the control handle and the hub need necessarily be oriented in the same plane or any common plane.

An implementation of the control handle 304 as a ring as shown in FIGS. 3-5 could be advantageous in terms of usability. Consider an embodiment in which a pan head is mounted to a pedestal column, such that video equipment is rotatable relative to the pedestal. If the pedestal control handle does not extend all the way around the hub 302, then the pan controls and the pedestal control handle could be oriented at different locations, requiring an operator to move between the controls for panning the video equipment and repositioning the pedestal. With a control handle 304, an operator is able to control the pedestal regardless of the current pan position of the video equipment. Although it is contemplated that a control handle might not extend entirely around the hub 302, a control handle as shown at 304 could be preferred.

A control handle such as 304, which extends around the hub 302, need not necessarily be a continuous handle formed from a single piece of material. In the example shown, there are different handle parts 322 coupled together using lap joints and fasteners 326. Lap joints and/or multiple fasteners 326 could be useful, for example, to reduce or avoid rotation between different parts of the control handle 304, and thereby create a sturdier structure.

The handle parts 322 are identical to each other in the example shown, but in other embodiments the handle parts could include parts that have different profiles or shapes. A control handle 304 could include more or fewer parts than the example shown, and could even be machined or otherwise fabricated as a single piece.

In operation, an effect of forces acting on each arm 306 is sensed by the sensors 331, 333. The combination of a structure 330 and adjacent sensors 331, 333 represent an illustrative example of a load cell. In an embodiment, each load cell includes a structure 330 and multiple sensors 331, 333, each of which includes a pair of sensor elements such as strain gauges. In some embodiments, a load cell includes multiple structures 330, with a respective structure located between each pair of sensor elements.

With reference to FIGS. 7-10, it can be seen that the surfaces at which the pair of sensor elements 702, 704 and the pair of sensor elements 706, 708 sense an effect of applied forces are perpendicular. The structures 330 is located between the pair of sensor elements 702, 704, and could concentrate an effect of a force component acting on the arm in one direction (left-right in FIGS. 7 and 9) for sensing or measurement by the sensor elements 702, 704. The same structure 330 could also, at least to some extent, concentrate an effect of a force component acting on the arm in a perpendicular direction, left-right in FIG. 8, for sensing or measurement by the pair of sensor elements 706, 708 as well. Even though the structure 330 is not positioned directly between the pair of sensor elements 706, 708, the structure reduces the cross-section of the arm 306 adjacent to the position of the pair of sensor elements 706, 708 and therefore could concentrate an effect of a component of an applied force to potentially improve sensing or measurement by the pair of sensor elements 706, 708. In other embodiments, another structure identical or similar to the structure 330 is located between the pair of sensor elements 706, 708, and oriented perpendicularly to the structure 330.

Such an arrangement of sensors and one or more concentration structures allows sensing of an effect (strains in the case of strain gauges) of an input force that is applied to the control device 300 and acting on each of the arms 306 relative to multiple directions. An effect such as strains, resulting from up/down force components (in the orientation shown in FIG. 4) could be individually measured at each arm 306 at 331 and side to side force components (in the orientation shown in FIG. 4) could similarly be individually measured at each arm 306 at 333.

Figure 11:
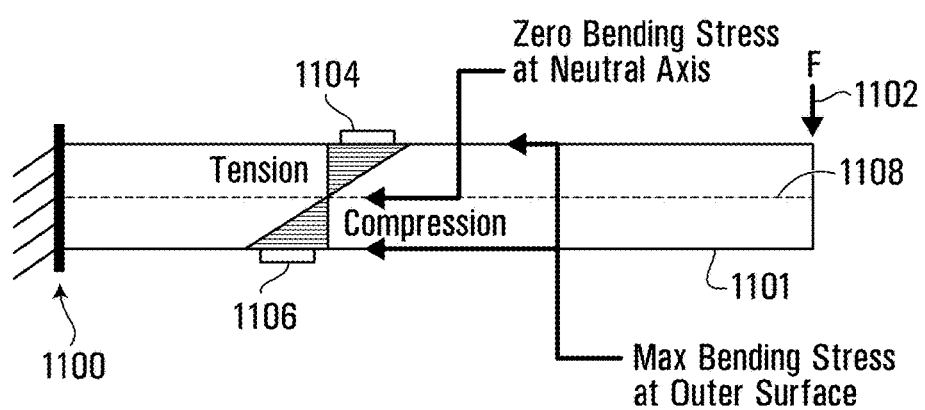
FIG. 11 illustrates surface strains as an example of an effect of a force that could be sensed or measured in an embodiment.

For further clarity, FIG. 11 illustrates surface strains as an example of an effect of a force that could be sensed or measured in an embodiment. Consider a force F at 1102 applied to a member 1101 that is coupled to a rigid fixture 1100. Strain gauges 1104, 1106 could be used to sense the normal strains due to bending on the outermost free surfaces, perpendicular to a loading axis along which the force F is applied at 1102. In the example of FIG. 11, strains due to bending that results from an up/down force F at 1102 are sensed by the strain gauges 1104, 1106. Another pair of strain gauges, coupled to perpendicular surfaces of the member 1101, could similarly sense normal strains due to bending of those surfaces as a result of a force applied in a direction into or out of the drawing sheet of FIG. 11.

Strain measurement is an example of sensing an effect of an input force acting on each arm 306 relative to multiple directions. In the example shown in FIGS. 3-10, an input force could have a force component at an arm 306 producing strain that can be measured by the sensor 331. An input force could also or instead have a force component at an arm 306 producing strain that can be measured by the sensor 333. These force components are in perpendicular directions in this example The strains in this example are also associated with perpendicular bending directions. If a control device were installed horizontally at the top of a pedestal column, for example, then the force component and bending directions could be considered side-to-side or horizontal and up-down or vertical directions. These directions are intended solely as illustrative examples. Other embodiments could sense effects other than normal strains, such as shear strain(s) or forces themselves, and/or sense effects in different directions than those in the example of FIGS. 3-10.

Sensor measurements could be used directly for controlling operation of video equipment, or subject to further processing to generate or derive control signals. For example, sensor readings could be resolved into linear force components and angular force (moment) components in the pedestal-relative frame of reference shown in FIG. 2. Details disclosed herein in respect of resolving sensor readings or measurements are intended for illustrative purposes, and could be adapted to other geometries relative to different sensing directions or arrangements and/or different frames of reference.

In FIGS. 3-5, the arms 306 are arranged at a known geometry, and strain measurements can therefore be resolved into linear force components Fx, Fy, Fz, and moment components Mx, My, Mz in the pedestal-relative frame of reference shown in FIG. 2. Not all of these components are necessarily used in all embodiments. For example, with reference to FIG. 2, the driven wheels 206 cannot be steered to change the direction of translation of the pedestal 200. In other words, the pedestal cannot directly move in the X direction in the pedestal-relative frame. In order to move the pedestal 200 in a direction other than the current Y direction, the pedestal 200 would first be rotated to re-orient the Y direction by rotating the wheels 206 in opposite directions or rotating only one of the wheels, and then both of the wheels 206 can be rotated to move the pedestal in the desired, re-oriented +/−Y direction. In this example, only three of the six components, specifically Fy (for lateral translation control of the pedestal), Fz (for pedestal column elevation control) and Mz (for rotation or turning control of the pedestal) are of interest. These resolved components are then used to control motion of the pedestal. Fy and Mz control movement of the pedestal base on a surface such as a floor, and Fz controls movement of an equipment support such as the pedestal column or an element mounted to the pedestal column, relative to the base. This is one embodiment, and is used herein as solely for illustrative purposes.

As an example, a 6 by 6 scaling or resolution matrix A could be defined such that A×ε=F|M, where ε is a vector of strain gauge measurements for V1, V2, V3 and L1, L2, L3 as labelled at 331, 333 in FIGS. 3 and 4, and F|M is a vector of F and M components:

$$\begin{bmatrix} A_{11} & A_{12} & A_{13} & A_{14} & A_{15} & A_{16} \\ A_{21} & A_{22} & A_{23} & A_{24} & A_{25} & A_{26} \\ A_{31} & A_{32} & A_{33} & A_{34} & A_{35} & A_{36} \\ A_{41} & A_{42} & A_{43} & A_{44} & A_{45} & A_{46} \\ A_{51} & A_{52} & A_{53} & A_{54} & A_{55} & A_{56} \\ A_{61} & A_{62} & A_{63} & A_{64} & A_{65} & A_{66} \end{bmatrix} \times \begin{bmatrix} \varepsilon_{V1} \\ \varepsilon_{V2} \\ \varepsilon_{V3} \\ \varepsilon_{L1} \\ \varepsilon_{L2} \\ \varepsilon_{L3} \end{bmatrix} = \begin{bmatrix} F_x \\ F_y \\ F_z \\ M_x \\ M_y \\ M_z \end{bmatrix}.$$

If A×ε=F|M, then $A^{-1} \times F|M = \varepsilon$. In one embodiment, A is populated with values that are determined based on the inverse $A^{-1}$. For example, various loads could be applied to the control device 300, and the strains measured on each spoke could then be used to populate $A^{-1}$. Once $A^{-1}$ is fully populated, it can be inverted to find the matrix A. According to one embodiment, the matrix A is as follows:

| 0 | 0 | 0 | 347.31 | 347.31 | −694.62 |
|---|---|---|---|---|---|
| 0 | 0 | 0 | −601.56 | 601.56 | 0 |
| 720.95 | 720.95 | 720.95 | 0 | 0 | 0 |
| −146.50 | −146.50 | 293.00 | 0 | 0 | 0 |
| −219.75 | 219.75 | 0 | 0 | 0 | 0 |
| 0 | 0 | 0 | 158.79 | 158.79 | 158.79 |

Other scaling or resolution matrices could apply to other embodiments, depending on such factors as control device arm geometry, sensor type, sensor placement or orientation, and/or the type(s) of motion that are to be controlled.

Sensor readings or measurements could be processed at a control device and/or by a controller in a pedestal. For example, control signals based on the sensor readings could be determined by the control device 150 or the controller 107 in FIG. 1, or by a controller or other element that is coupled to the sensors 331, 333 in FIG. 3. The F and M values in the above example are illustrative examples of such control signals that could be determined based on sensor readings. Sensor readings, control signals based on the sensor readings, or both, could be provided to the pedestal to control motion of the pedestal. Processing of sensor readings or further processing of control signals could be applied to generate signals in the format(s) or at level(s) that are used for actual control of controlled components, and signal formats and levels may vary between different components. However, even if sensor readings are further processed to generate control signals or other signals that are applied to controlled elements, such signals and therefore control of the controlled elements are still based on the sensor readings.

Signal processing and format/level conversion are examples of operations that could be implemented using hardware, firmware, components which execute software, or some combination thereof. At least a controller, whether provided as part of a control device and/or a pedestal, could be implemented using components which execute software. Electronic devices that might be suitable for this purpose include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

FIGS. 1 to 10 and the related description above include various example features relating to motion control for a video equipment pedestal. In the context of driving motion of a pedestal, lateral, rotational, and elevation control are contemplated. Other features may also or instead be provided in other embodiments.

For example, motion control need not necessarily apply only one speed of movement, and could instead mimic the laws of motion. A controlled component could be accelerated or decelerated at a rate, or moved at a velocity, that is based on the magnitude of an applied force. In this way, motion of a pedestal or other controlled component could be made proportional to input force, which may further assist in making control more intuitive for operators. Acceleration/deceleration, velocity, and/or position could be constrained according to limits, which could be preset or configurable, in memory for example. The same or different limits could be applied to translation, rotation, and elevation. Other limits on movement, depending on the size of a floor space or ceiling height for example, could also or instead be establish to constrain motion.

There could also or instead be lower limits on the amount of force that initiates active control. A strain gauge could generate a reading, due thermal expansion or interference for example, which is not significant for motion control. It might also be useful not to have a pedestal or other controlled component move as a result of relatively light contact with a control handle by an operator, which may be inadvertent. Settings could be preset and/or configurable, in memory for example, to establish a "dead zone" within which sensor readings are ignored. Sensor readings could be assigned different polarities, such as positive/negative for strains from left/right bending and up/down bending of the arms 306 in FIG. 3, and a dead zone could have the same or different threshold values for each polarity.

Different dead zone thresholds could also or instead be applied for different types of motion control. For example, the dead zone threshold(s) for elevation control could be smaller than the dead zone threshold(s) for lateral translation and/or rotation. An operator may be more accustomed to applying larger forces to a steering ring to move a manual pedestal, for example, relative to smaller forces to move a mechanically assisted pedestal column up or down, and different dead zone thresholds could take this into account.

Dead zones need not be applied only to sensor readings. For example, it may be difficult for an operator to provide an input force only in the direction in which a pedestal or other controlled component is to be moved. It is unlikely that an operator could apply an input force solely in the Y or Z direction or a rotational force around the Z direction in FIG. 2, for instance, without applying any other force in any other direction. Another possible application of dead zones or thresholds could be in ignoring processed signals that are below a threshold. The same or different thresholds could be applied to F and M values, and/or to forces relative to different axes in a frame of reference.

A dead zone or threshold could be useful in reducing the impact of residual forces and torques on pedestal control, although calibration could also or instead be used for this purpose. For example, calibration factors could be determined based on sensor readings in the absence of any input forces and taken into account in processing sensor signals. In some embodiments, a control device or its sensors could be calibrated to zero out residual forces and torques to effectively remove them from future sensor readings.

In some embodiments, a user input device could be provided to control a virtual mass associated with movement of the pedestal or other controlled component. This provides an operator with freedom to control the weight and feel of robotic control according to preference. This feature could provide for emulation of mass, comparable to a manual pedestal for example, by controlling how responsive actual movement is to applied input force. The amount of input force required to move a pedestal or other component could be dependent upon one or more virtual mass settings. The same or different virtual mass settings could be used for different types of motion control, for lateral translation, rotation, and/or column elevation, or virtual mass could be implemented only for certain types of motion control.

A similar feature could be implemented to enable an operator to control virtual friction associated with movement of a pedestal or other controlled component, which again could be valuable in allowing an operator to adjust motion control to their preference. A virtual friction setting could be used to control such characteristics as how quickly a pedestal or other controlled component starts to move after an input force is applied to a control handle, how much force is to be applied to maintain movement, and/or how quickly a pedestal or other component comes to a stop after input force is reduced or removed. The same or different virtual friction settings could be used for different types of motion control, or virtual friction could be implemented only for certain types of motion control.

Virtual mass, virtual friction, or both, could be implemented using one or more processors or other elements that execute software, and controlled using configuration settings in memory, for example. Such settings could be applied in further processing sensor readings, F|M values in the above example, and/or other signals.

A user input device could also or instead be provided to control enabling and disabling of driving motion of a video equipment pedestal or other controlled component by the controller. In one embodiment, such a user input device could toggle control between local control by a control device that is mounted to or otherwise provided at a pedestal, and remote control by a control device that is separate from the pedestal. In another embodiment, robotic control could be enabled or disabled, to effectively decouple robotic control from the pedestal and allow an operator to revert to manual control. For a pedestal mounted control device of the type shown in FIG. 3, for example, an operator might wish to switch to manual control, and use the same control device 300 to manually move the pedestal. In this case, the sensors 331, 333 could continue to provide sensor readings, but those readings would not be used for motion control when the pedestal is set for manual control. A control device such as 300 could therefore be used not only for robotic control but also for manual control.

Figure 12:
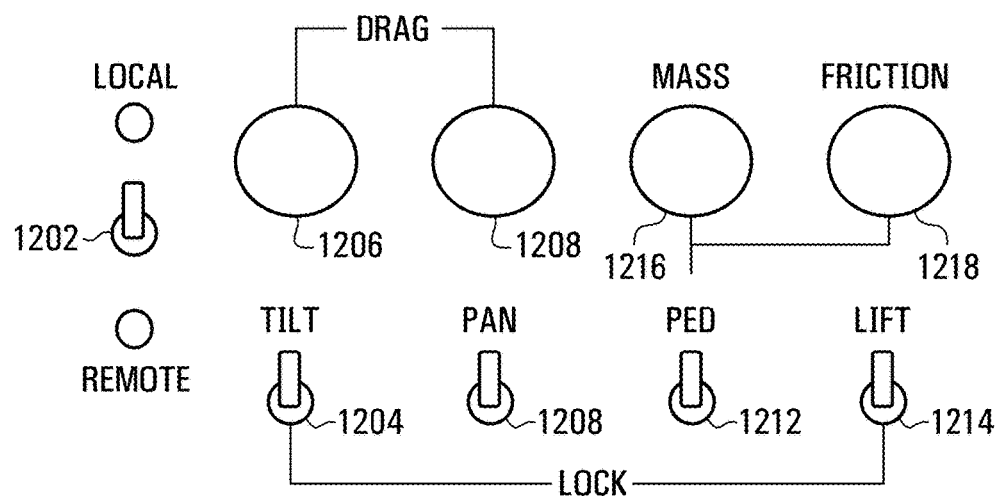
FIG. 12 is a diagram illustrating example user input devices.

FIG. 12 is a diagram illustrating example user input devices that could be provided in some embodiments. One or more of the user input devices could be implemented in a control box that is mounted a pedestal or a pedestal control device such as the control device 300 in FIG. 3, for example. Similar user input devices could be used in conjunction with controlled components other than pedestals.

In FIG. 12, the example user input devices include the following:

Local/Remote toggle switch 1202 to engage and disengage local control —Light Emitting Diodes (LEDs) are also shown as an example of a user output devices to provide indications of status, in this case local/remote control status Tilt Lock toggle switch 1204 to control locking of a head or equipment in place against rotation about a tilt axis Tilt Drag knob 1206 to adjust the amount of resistance to tilt motion Pan Lock toggle switch 1208 to control locking of a head or equipment in place against rotation about a pan axis Pan Drag knob 1210 to adjust the amount of resistance to pan motion of a head or equipment Ped Lock toggle switch 1212 to control enabling and disabling of rotation and translation of a pedestal on a support surface—rotation and translation could instead be separately enabled and disabled Lift Lock toggle switch 1214 to control enabling and disabling lift motion or elevation of a pedestal column Ped Mass knob 1216 to adjust virtual mass, which could be considered constants of proportionality between force/torque and acceleration Ped Friction knob 1218 to adjust virtual friction, which could include either or both of static and dynamic friction for floor and/or lift movements. Static friction determines the amount of force/torque needed before the pedestal responds (an example of a dead zone). Dynamic friction determines how quickly velocity is reduced following removal of applied force/torque. Both parameters are adjusted with the same control in this example, but in other embodiments separate user input devices could be provided for static and dynamic friction, and/or for floor (translation/rotation) and lift (elevation) movement.

The examples shown in FIG. 12 are intended for illustrative purposes. Variations are possible in other embodiments.

For example, other types of input devices could be used instead of or in addition to the toggle switches and knobs shown in FIG. 12. A Graphical User Interface (GUI) on a display screen could include multiple user input elements. Other embodiments could include additional or fewer input devices, to control other features such as zoom, focus, and/or Dutch Roll, for example. In the example shown in FIG. 12, one toggle switch 1212 is provided to control enabling and disabling of rotation and translation of a pedestal on a support surface. However, rotation and translation of a controlled component could instead be separately enabled and disabled. For example, separate toggle switches could be provided for rotation and translation. An operator who wants a pure translation can then lock the rotation axis and the pedestal or other component will move in a straight line. More generally, enabling/unlocking or disabling/locking motion control could be per axis or direction.

Similarly, other indicators including different types of indicators could be provided instead of or in addition to the local/remote LED indicators.

Embodiments are described above primarily in the context of example apparatus implementations. Method embodiments are also contemplated.

Figure 13:
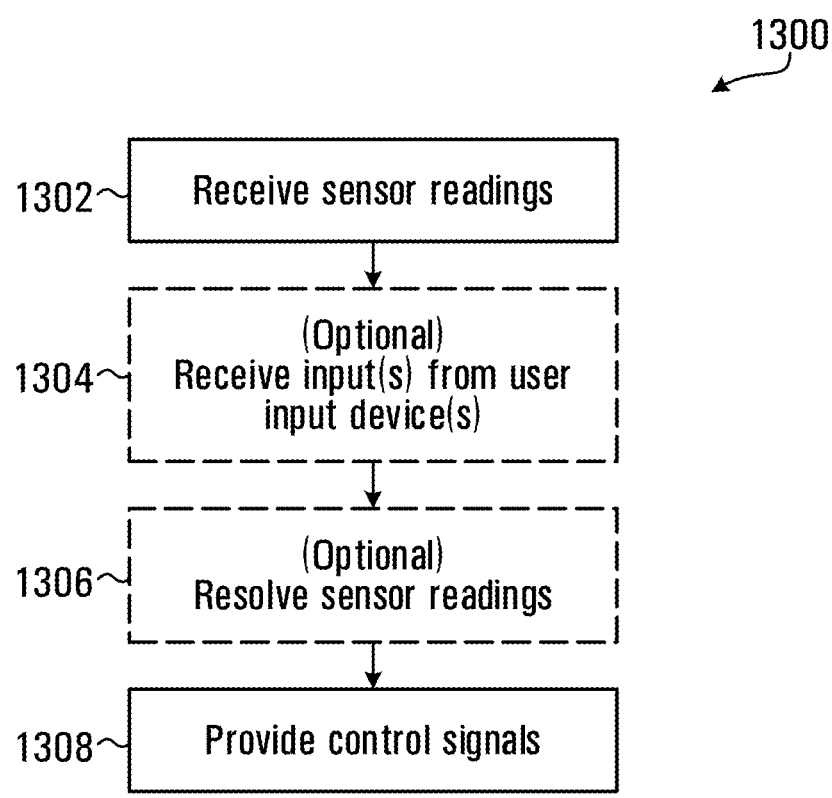
FIG. 13 is a flow diagram illustrating an example method.

FIG. 13 is a flow diagram illustrating an example method 1300, relating to operation or use of a control device. The method involves, as shown at 1302, receiving sensor readings. The sensor readings are received from sensors that sense an effect of an input force that is applied to a control device and acts on each of a number of arms of the control device relative to multiple directions. The arms extend in respective different directions between a control handle of the control device and a hub of the control device around which the control handle at least partially extends.

In some embodiments, inputs may be received from one or more user input devices. For example, a control signal that is generated based on the sensor readings could control motion of video equipment. An input could be received at 1304 from a user input device that is provided to control virtual mass associated with the motion. An input could also or instead be received at 1304 from any one or more of a user input device that is provided to control virtual friction associated with the motion, a user input device that is provided to control enabling and disabling motion control of the video equipment based on the control signal, and/or a user input device that is provided to control enabling and disabling of motion control relative to any one or more of multiple axes.

Any of various techniques could be used to generate control signals based on the sensor readings that are received at 1302, and any inputs received at 1304. In an embodiment, the received sensor readings are resolved into linear force components and moment components at 1306, and control signals are generated based on the linear force components and the moment components. An example of such resolution and control signal generation is provided above.

At 1308, control signals that are based on at least the sensor readings are provided to video equipment. The control signals could be or include one or more control signals that are further based on any inputs received at 1304. Virtual mass and/or virtual friction could affect control signals that are provided to control motion of video equipment or a video equipment pedestal, for example. In the case of inputs from user input devices that are provided to enable or disable motion control, or motion control relative to one or more specific axes, control signals or outputs could be provided at 1308 only when motion control is enabled, and either not provided at 1308 or ignored by a controller or controlled device if motion control is disabled.

Control signals could be provided to a local controller, in embodiments in which the method 1300 is implemented at or in conjunction with controlled equipment, and/or to a controller that is located remotely from the control device.

The method 1300 is intended solely for illustrative purposes. Other embodiments could include fewer, additional, and/or different operations, performed in a similar or different order than shown. Operations could also or instead be performed in any of various ways. Variations of the method 1300 could be or become apparent, for example, from the disclosure of apparatus embodiments herein.

Figure 14:
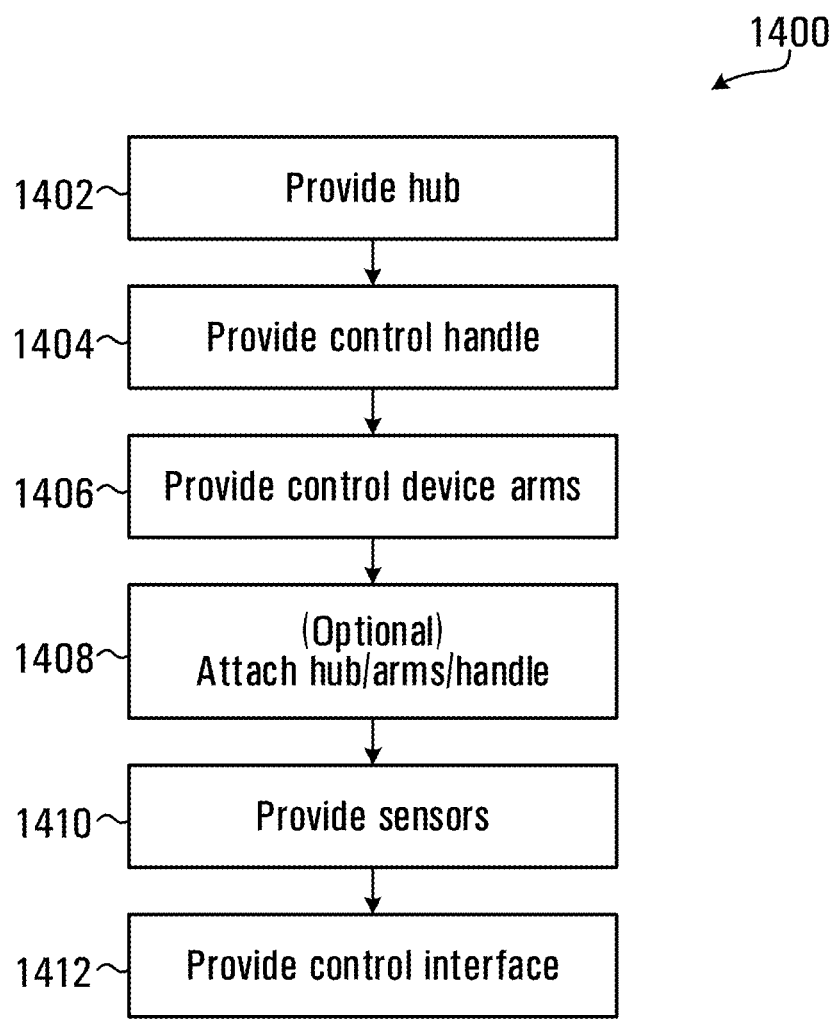
FIG. 14 is a flow diagram illustrating an example method according to another embodiment.

FIG. 14 is a flow diagram illustrating an example method according to another embodiment. The example method 1300 in FIG. 13 relates to operation or use of a control device or equipment, and the example method 1400 relates to manufacturing or otherwise providing a control device.

The method 1400 involves providing a video equipment control device hub at 1402, providing a control handle for the video equipment control device at 1404, and providing arms for the video equipment control device at 1406. The control handle extends at least partially around the hub, and the arms extend in respective different directions between the hub and the control handle.

Although shown as separate operations in FIG. 14, in some embodiments a control device with the hub, arms, and control handle integrated together in a control device could be provided. In other embodiments, any or all of the hub, arms, and control handle could be provided as separate components and be attached together at 1408. The arms could be attached to the hub and the control handle as shown in the example control device shown in FIGS. 3-10, for example. Similarly, any of the hub, arms, and control handle could be provided in multiple parts, as in the example control handle 304 of FIGS. 3-5, that are assembled and attached together at 1408.

Sensors are provided at 1410, to sense an effect of an input force applied to the control device and acting on each of the arms relative to multiple directions. The sensors could be provided with the arms at 1406 as integrated sensors, or provided separately and mounted to the arms.

A controller interface could be provided at 1412 and coupled to the sensors, to enable communication with a controller of video equipment. The sensors could include one or more connectors, or coupling elements such as connectors and/or conductors could be provided separately as a controller interface.

Other components could also be provided. For example, the controller with which the controller interface enables communication could be configured to drive motion of the video equipment based on readings by the sensors, and any one or more of the following user input devices could be provided: a user input device to control virtual mass associated with the motion; a user input device to control virtual friction associated with the motion; a user input device to control enabling and disabling of motion control; and a user input device to control enabling and disabling of motion relative to any one or more of multiple axes.

Like the method 1300 in FIG. 13, the method 1400 is intended solely for illustrative purposes. Other embodiments could include fewer, additional, and/or different operations, performed in a similar or different order than shown, and operations could also or instead be performed in any of various ways. For example, any or all of the providing operations could involve manufacturing the provided component(s), or purchasing or otherwise acquiring the control device component(s). Other components, such as video equipment and/or components of a video equipment pedestal, could be provided and coupled to a control device. The control device could be local to the controlled video equipment or pedestal, or located remotely for remote control.

Further variations of the method 1400 could be or become apparent from the disclosure of apparatus embodiments herein, for instance.

What has been described is merely illustrative of the application of principles of embodiments of the present disclosure. Other arrangements and methods can be implemented by those skilled in the art.

For example, the present disclosure concentrates primarily on pedestal control. A video equipment pedestal itself could include a base, an equipment support such as a pedestal column coupled to the base to support video equipment on the base, a hub coupled to the equipment support when a control device such as the control device 300 in FIG. 3 is installed on a pedestal, a control handle extending at least partially around the hub, arms extending between the hub and the control handle, and a controller. The arms extend in respective different directions, as shown by way of example in FIG. 3, between the hub and the control handle, and each of the arms includes sensors. The controller is coupled to the sensors, to drive motion of the video equipment pedestal based on readings by the sensors in some embodiments. This represents one example of a video equipment pedestal.

Such a pedestal could be implemented in a video equipment system, in combination with video equipment mounted to the equipment support.

Further variations of the teachings herein are also contemplated. The divisions of functions represented in the drawings, for example, are solely for illustrative purposes. Other embodiments could include fewer, more, and/or different components than explicitly shown, interconnected in the same or a different order. Methods could similarly include fewer, more, and/or different operations performed in a similar or different manner than explicitly described herein.

Motion control and other types of control are disclosed herein. A ring with sensors could be used for any of various types of control. For example, in one embodiment described above, strain measurements are resolved into linear force components Fx, Fy, Fz, and moment components Mx, My, Mz in the pedestal-relative frame of reference shown in FIG. 2, but only three of these six components might be used to control movement of a pedestal. Even the if Fy, Fz, and Mz components are used for motion control in this example, any of the other three components could be used for other types of control, such as using My to control tilt and Fx to control zoom. Resolved force and moment components could also or instead be used for other control actions, such as using Mz to control pan. It is also contemplated that the feature(s) controlled by one or more linear force and/or moment components could be switched. For example, an operator could change the position of a toggle switch to switch between using Mz to control motion to using Mz to control pan.

In addition, although described primarily in the context of apparatus and methods, other implementations are also contemplated, as instructions stored on a non-transitory computer-readable medium, for example.

We claim:
1. A video equipment control device to control video equipment, the video equipment control device comprising:
    a hub;
    a control handle extending at least partially around the hub;
    a plurality of arms extending in respective different directions between the hub and the control handle;
    a plurality of sensors, comprising multiple sensors mounted to each of the plurality of arms, to sense an effect of an input force applied to the video equipment control device and acting on each of the plurality of arms relative to multiple directions; and
    a controller interface, coupled to the plurality of sensors, to enable communication with a controller that is configured to drive a motion of the video equipment.

2. The control device of claim 1, wherein the control handle comprises a ring that extends around the hub.

3. The control device of claim 1, further comprising a respective compliant coupling between the control handle and each of the plurality of arms.

4. The control device of claim 3, wherein each compliant coupling comprises a leaf spring.

5. The control device of claim 1, further comprising:
    the controller, coupled to the controller interface, to receive readings from the sensors and to provide control signals to the video equipment based on the readings.

6. The control device of claim 1, wherein the controller is separate from the control device.

7. A video equipment pedestal comprising:
    a base;
    an equipment support coupled to the base, to support video equipment controllable by a video equipment control device on the base;
    a hub coupled to the equipment support;
    a control handle extending at least partially around the hub;
    a plurality of arms extending in respective different directions between the hub and the control handle;
    a plurality of sensors, comprising multiple sensors mounted to each of the plurality of arms, to sense an effect of an input force applied to the video equipment control device and acting on each of the plurality of arms relative to multiple directions; and
    a controller coupled to the sensors, to drive motion of the video equipment pedestal based on readings by the sensors.

8. The video equipment pedestal of claim 7, wherein the motion comprises movement of the base on a surface.

9. The video equipment pedestal of claim 7, wherein the motion comprises movement of the equipment support relative to the base.

10. The video equipment pedestal of claim 7, further comprising:
    a user input device to control virtual mass associated with the motion.

11. The video equipment pedestal of claim 7, further comprising:
a user input device to control virtual friction associated with the motion.

12. The video equipment pedestal of claim 7, further comprising:
a user input device to control enabling and disabling of driving motion of the video equipment pedestal by the controller.

13. The video equipment pedestal of claim 7, further comprising:
a user input device to control enabling and disabling of motion relative to any one or more of multiple axes.

14. A video equipment system comprising:
the video equipment pedestal of claim 7; and
video equipment mounted to the equipment support.

15. A method comprising:
receiving readings from a plurality of sensors, comprising multiple sensors mounted to each of a plurality of arms of a control device, to sense an effect of an input force applied to a control device and acting on each of the plurality of arms of the control device relative to multiple directions, the plurality of arms extending in respective different directions between a control handle of the control device and a hub of the control device around which the control handle at least partially extends; and
providing control signals to drive a motion of video equipment based on the readings.

16. The method of claim 15, further comprising:
resolving the readings into linear force components and moment components; and
generating the control signals based on the linear force components and the moment components.

17. The method of claim 15, wherein the providing comprises providing the control signals to a controller that is located remotely from the control device.

18. The method of claim 15, further comprising:
receiving an input from a user input device to control virtual mass associated with the motion,
the providing comprising providing the control signal to control the motion of the video equipment further based on the received input.

19. The method of claim 15, further comprising:
receiving an input from a user input device to control virtual friction associated with the motion,
the providing comprising providing the control signal to control the motion of the video equipment further based on the received input.

20. The method of claim 15, further comprising:
receiving an input from a user input device to control enabling and disabling motion control of the video equipment based on the control signal.

21. The method of claim 15, further comprising:
receiving an input from a user input device to control enabling and disabling of motion control relative to any one or more of multiple axes.

22. A method comprising:
providing a hub for a video equipment control device;
providing a control handle for a video equipment control device, the control handle extending at least partially around the hub;
providing a plurality of arms for the video equipment control device, the plurality of arms extending in respective different directions between the hub and the control handle;
providing a plurality of sensors, comprising multiple sensors mounted to each of the plurality of arms, to sense an effect of an input force applied to the video equipment control device and acting on each of the arms relative to multiple directions; and
providing a controller interface, coupled to the plurality of sensors, to enable communication with a controller that is configured to drive a motion of the video equipment.

23. The method of claim 22, wherein the controller is configured to drive motion of the video equipment based on readings by the plurality of sensors, the method further comprising providing one or more of:
a user input device to control virtual mass associated with the motion;
a user input device to control virtual friction associated with the motion;
a user input device to control enabling and disabling of motion control; and
a user input device to control enabling and disabling of motion relative to any one or more of multiple axes.

* * * * *

UNITED STATES PATENT AND TRADEMARK OFFICE
CERTIFICATE OF CORRECTION

PATENT NO. : 10,375,290 B2
APPLICATION NO. : 15/818663
DATED : August 6, 2019
INVENTOR(S) : Neil Webster et al.

It is certified that error appears in the above-identified patent and that said Letters Patent is hereby corrected as shown below:

In the Claims

At Column 19, Line 21 – Claim 15: "applied to a control device" should read -- applied to the control device --

At Column 20, Line 17 – Claim 22: "providing a control handle for a video equipment control" should read -- providing a control handle for the video equipment control --

Signed and Sealed this
Third Day of March, 2020

Andrei Iancu
*Director of the United States Patent and Trademark Office*